US008744860B2

(12) United States Patent
Chang et al.

(10) Patent No.: US 8,744,860 B2
(45) Date of Patent: Jun. 3, 2014

(54) APPARATUS AND METHOD FOR PROVIDING MESSAGES IN A SOCIAL NETWORK

(75) Inventors: Hisao Chang, Cedar Park, TX (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 936 days.

(21) Appl. No.: 12/848,440

(22) Filed: Aug. 2, 2010

(65) Prior Publication Data

US 2012/0029917 A1  Feb. 2, 2012

(51) Int. Cl.
*G06F 17/27* (2006.01)
*G10L 21/00* (2013.01)
*G10L 25/00* (2013.01)

(52) U.S. Cl.
USPC ............. 704/275; 704/9; 704/270; 704/270.1

(58) Field of Classification Search
USPC .............................................. 704/9, 270–275
See application file for complete search history.

(56) References Cited

U.S. PATENT DOCUMENTS

| 5,884,256 | A  | * | 3/1999  | Bennett et al. ................ 704/235 |
|-----------|----|---|---------|---------------------------------------|
| 6,100,882 | A  | * | 8/2000  | Sharman et al. .............. 704/235 |
| 6,292,769 | B1 | * | 9/2001  | Flanagan et al. .................. 704/3 |
| 6,505,160 | B1 | * | 1/2003  | Levy et al. .................... 704/270 |
| 6,507,815 | B1 | * | 1/2003  | Yamamoto ..................... 704/231 |
| 6,748,360 | B2 | * | 6/2004  | Pitman et al. ................ 704/270 |
| 6,757,365 | B1 | * | 6/2004  | Bogard ....................... 379/88.17 |
| 6,879,956 | B1 | * | 4/2005  | Honda et al. .................. 704/244 |
| 7,117,152 | B1 | * | 10/2006 | Mukherji et al. ............. 704/235 |
| 7,236,580 | B1 | * | 6/2007  | Sarkar et al. ............. 379/202.01 |
| 7,515,917 | B2 | * | 4/2009  | Casey ........................ 455/456.1 |
| 7,526,423 | B2 | * | 4/2009  | Suzuki ............................ 704/2 |
| 7,627,638 | B1 | * | 12/2009 | Cohen .......................... 709/206 |
| 7,711,564 | B2 | * | 5/2010  | Levy et al. .................... 704/270 |
| 7,788,084 | B2 | * | 8/2010  | Brun et al. ........................ 704/7 |
| 7,870,142 | B2 | * | 1/2011  | Michmerhuizen et al. ... 707/755 |
| 7,904,297 | B2 | * | 3/2011  | Mirkovic et al. ............. 704/257 |
| 7,917,581 | B2 | * | 3/2011  | Moore et al. .................. 709/204 |
| 7,987,280 | B1 | * | 7/2011  | Putnam et al. ................ 709/231 |
| 8,169,409 | B2 | * | 5/2012  | Castagnet ..................... 345/171 |
| 8,265,671 | B2 | * | 9/2012  | Gould et al. .................. 455/466 |
| 8,312,057 | B2 | * | 11/2012 | John ............................ 707/804 |
| 8,335,801 | B2 | * | 12/2012 | Gardner et al. ............... 707/791 |
| 2002/0022954 | A1 | * | 2/2002 | Shimohata et al. ............... 704/3 |
| 2002/0045960 | A1 | * | 4/2002 | Phillips et al. .................. 700/94 |
| 2002/0133354 | A1 | * | 9/2002 | Ross et al. .................... 704/275 |
| 2002/0147589 | A1 | * | 10/2002 | Itaki ............................. 704/260 |
| 2003/0002633 | A1 | * | 1/2003 | Kredo et al. ............... 379/88.08 |
| 2003/0050058 | A1 | * | 3/2003 | Walsh et al. .................. 455/426 |

(Continued)

*Primary Examiner* — Eric Yen
(74) *Attorney, Agent, or Firm* — Guntin & Gust, PLC; Andrew Gust (57) ABSTRACT

A system that incorporates teachings of the present disclosure may include, for example, a server including a controller to receive audio signals and content identification information from a media processor, generate text representing a voice message based on the audio signals, determine an identity of media content based on the content identification information, generate an enhanced message having text and additional content where the additional content is obtained by the controller based on the identity of the media content, and transmit the enhanced message to the media processor for presentation on the display device, where the enhanced message is accessible by one or more communication devices that are associated with a social network and remote from the media processor. Other embodiments are disclosed.

20 Claims, 7 Drawing Sheets

(56) References Cited

U.S. PATENT DOCUMENTS

| | | |
|---|---|---|
| 2004/0102971 A1* | 5/2004 | Lipscher et al. .............. 704/236 |
| 2004/0128141 A1* | 7/2004 | Murase et al. ................ 704/275 |
| 2004/0143581 A1* | 7/2004 | Bohannon et al. ............ 707/100 |
| 2004/0158860 A1* | 8/2004 | Crow ............................ 725/46 |
| 2004/0199387 A1* | 10/2004 | Wang et al. ................... 704/243 |
| 2005/0043948 A1* | 2/2005 | Kashihara et al. ............ 704/242 |
| 2005/0055210 A1* | 3/2005 | Venkataraman et al. ..... 704/255 |
| 2005/0149318 A1* | 7/2005 | Honda et al. ....................... 704/9 |
| 2005/0289065 A1* | 12/2005 | Weare ............................. 705/51 |
| 2006/0079291 A1* | 4/2006 | Granovetter et al. ......... 455/563 |
| 2006/0100876 A1* | 5/2006 | Nishizaki et al. ............. 704/257 |
| 2007/0038436 A1* | 2/2007 | Cristo et al. ....................... 704/9 |
| 2007/0071206 A1* | 3/2007 | Gainsboro et al. ............ 379/168 |
| 2008/0189110 A1* | 8/2008 | Freeman et al. .............. 704/251 |
| 2009/0006566 A1* | 1/2009 | Veeramachaneni et al. .. 709/206 |
| 2009/0055186 A1* | 2/2009 | Lance et al. ................... 704/260 |
| 2009/0144366 A1* | 6/2009 | Lyle .............................. 709/204 |
| 2009/0172108 A1* | 7/2009 | Singh ............................ 709/206 |
| 2009/0222255 A1* | 9/2009 | Cox et al. ........................... 704/1 |
| 2010/0049501 A1* | 2/2010 | Kennewick et al. ............. 704/9 |
| 2010/0115114 A1 | 5/2010 | Headley |
| 2011/0195659 A1* | 8/2011 | Boll et al. .................... 455/11.1 |
| 2013/0159445 A1* | 6/2013 | Zonka et al. .................. 709/206 |
| 2013/0326354 A1* | 12/2013 | Anderson .................... 715/733 |

* cited by examiner

APPARATUS AND METHOD FOR PROVIDING MESSAGES IN A SOCIAL NETWORK

FIELD OF THE DISCLOSURE

The present disclosure relates generally to media content communication and more specifically to an apparatus and method for providing messages in a social network.

BACKGROUND

Social networks implemented through websites continue to grow in popularity. The social networks typically allow users to selectively share their experiences with other members of the social network through posting of information by a poster.

The social networks often allow the poster to control which members have access to the posted information. The posted information often contains a description of a life experience of the poster, and select members can comment on the experience, which generates a discussion forum for the poster, as well as the select members.

DETAILED DESCRIPTION

One embodiment of the present disclosure can entail a server including a controller to receive audio signals and content identification information from a gateway. The audio signals can represent a voice message inputted into a remote control device in communication with the gateway. The voice message can be inputted into the remote control device when media content is being presented by a display device in communication with the gateway. The content identification information can be associated with the media content. The controller of the server is operable to generate text representing the voice message based on the audio signals and determine an identity of the media content based on the content identification information. The controller of the server is also operable to generate an enhanced message including the text and additional content, where the additional content is obtained by the server's controller based on the identity of the media content. The controller of the server is further operable to transmit the enhanced message to the gateway for presentation on the display device, where the enhanced message is accessible by one or more communication devices that are associated with a social network and remote from the gateway.

One embodiment of the present disclosure can entail a computing device including a controller to wirelessly receive a voice message from a remote communication device where the voice message is an input into the remote communication device, and transmit the voice message to a server for generating text based on the voice message. The controller is also configured to transmit content identification information associated with media content to the server, where an identity of the media content being presented at the time of receiving the voice message is determined by the server based on the content identification information, where an enhanced message comprising the text and additional content is generated by the server, and wherein the additional content is obtained by the server based on the identity of the media content. The controller is further configured to receive the enhanced message from the server, and provide the enhanced message for presentation on a display device in communication with the computing device, where the enhanced message is accessible by one or more other communication devices that are associated with a social network and remote from the computing device.

One embodiment of the present disclosure can entail a method including receiving a voice message at a server, where the voice message is received from a media processor and is associated with media content presented by the media processor. The method can also include determining a context of the voice message using the server and obtaining additional content using the server, where the additional content is obtained based on an identity of the media content and a context of the voice message. The method can further include generating an enhanced message using the server, where the enhanced message includes the additional content and text representing the voice message.

Figure 1:
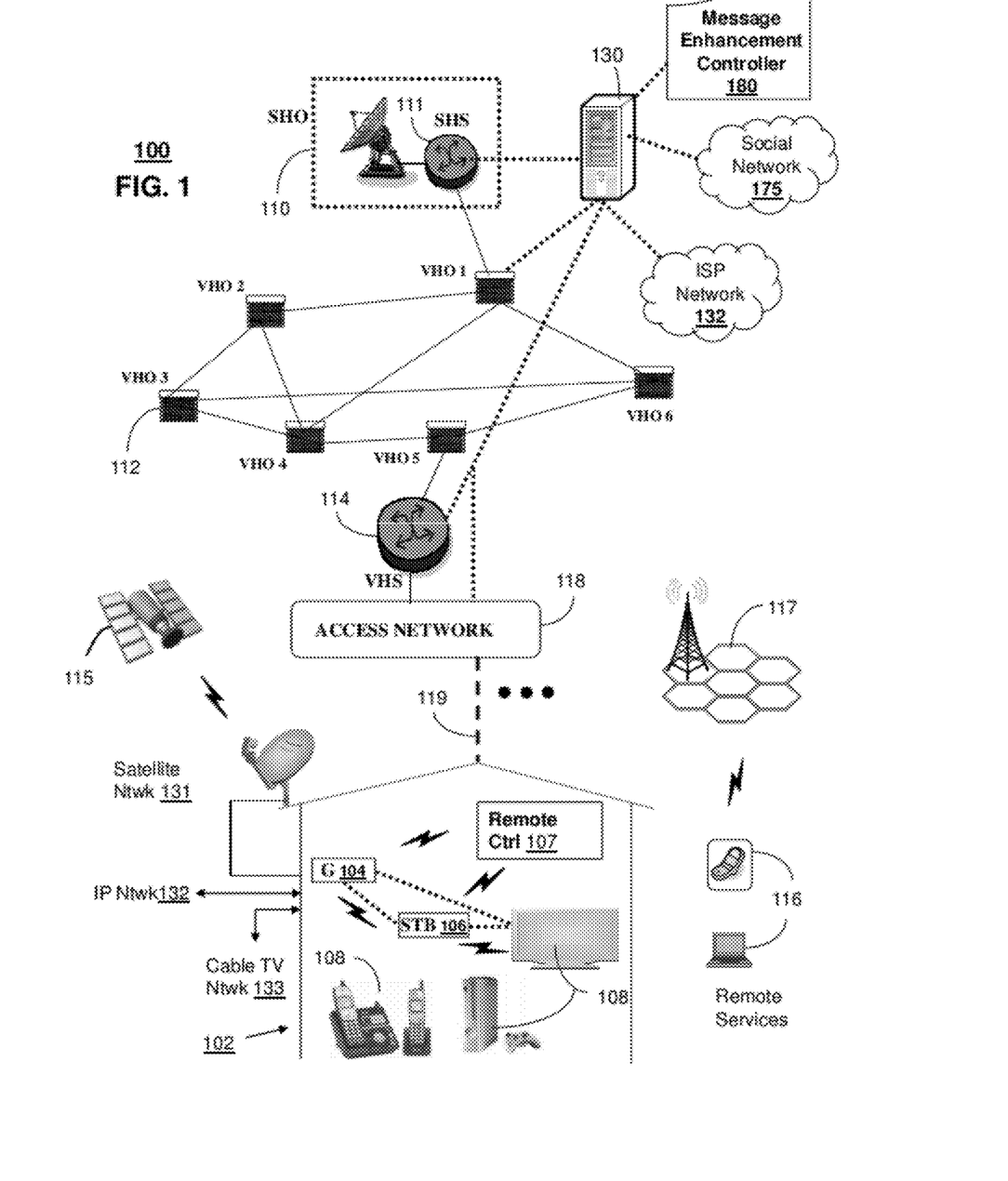
FIGS. 1 and 3 depict illustrative embodiments of communication systems that provide media services.

FIG. 1 depicts an illustrative embodiment of a first communication system 100 for delivering media content and/or messages. The communication system 100 can represent an Internet Protocol Television (IPTV) broadcast media system, although other media broadcast systems are contemplated by the present disclosure. The IPTV media system 100 can include a super head-end office (SHO) 110 with at least one super headend office server (SHS) 111, which can receive media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provides broadband services over optical links or copper twisted pairs 119 to buildings 102. The gateway 104 can use common communication technology to distribute broadcast signals to media devices 108 such as computers, television sets, managed in some instances by a media controller 107 (such as an infrared or RF remote control, gaming controller, etc.). In one embodiment, the gateway 104 can deliver the media content to media processors 106 such as Set-Top Boxes (STBs) or gaming consoles, which in turn present broadcast channels to the media devices 108.

In one embodiment, the gateway 104 can deliver the media content to the display devices 108 without using an intermediary media processor 106, such as an STB. For instance, the gateway 104 can selectively bypass the set top box 106 and deliver the media content directly to the display device 108. The gateway 104 can determine a type or format of media content that is being received and can determine if the media content is compatible with a set top box 106 connected with a particular display device 108. If there is an incompatibility determined, then the gateway 104 can bypass the set top box 106 and deliver the media content directly to the display device 108. In another example, the gateway 104 can determine the compatibility issue and can reformat the media content for delivery based on the compatibility determination.

In another embodiment, the gateway 104 can utilize a common format or protocol for delivery of data to a plurality of communication devices (e.g., television, desktop computer, video gaming console, mobile cellular phone, camera, media player, and so forth) throughout the residence or other building 102. For example, Digital Living Network Alliance (DLNA) technology can be utilized by the gateway 104, as well as other communication devices in the residence or building 102, to enable PC Internet, mobile and consumer electronics devices to find each other, communicate, share and display multimedia content while adhering to digital rights management associated with the media content. In this embodiment, the gateway 104 can communicate directly with one or more of the display devices 108 without using an STB.

The gateway 104, the media processors 106, and/or media devices 108 can utilize tethered interface technologies (such as coaxial, phone line, or power line wiring) or can operate over a common wireless access protocol such as Wireless Fidelity (WiFi). With these interfaces, unicast communications can be invoked by the gateway 104 and/or the media processors 106 from the subsystems of the IPTV media system for services, such as video-on-demand (VoD), browsing an electronic programming guide (EPG), or other infrastructure services.

Some of the network elements of the IPTV media system 100 can be coupled to one or more computing devices 130. The computing devices 130, or a portion thereof, can operate as a web server for providing portal services over an Internet Service Provider (ISP) network 132 to wireline media devices 108 or wireless communication devices 116 (e.g., cellular phone, laptop computer, etc.) by way of a wireless access base station 117. The base station 117 can operate according to common wireless access protocols such as WiFi, or cellular communication technologies (such as GSM, CDMA, UMTS, WiMAX, Software Defined Radio or SDR, and so on).

In one embodiment, a satellite broadcast television system can be used in place of, or in addition to, the IPTV media system 100. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the IP network 132 to enable services such as VoD and EPG described above.

In yet another embodiment, an analog or digital broadcast distribution system, such as cable TV system 133, can be used in place of, or in addition to, the IPTV media system described above. In this embodiment, the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

The computing devices 130 can include a controller 180 for performing message enhancement associated with a social network 175. The social network 175 can be a website maintained by a plurality of servers that is accessible by users for providing messages and other information to each other, such as Facebook®, MySpace®, Twitter®, and so forth.

The controller 180 can receive an audio message and can convert it into text. The controller 180 can also enhance the text based on media content that was being viewed (e.g., movies) or otherwise consumed (e.g., songs or video games) at the time that a request for the message was made by the user. In one embodiment, the message request can include information associated with an identification of the media content that was being viewed or consumed. For example, the information can be metadata that includes a title of the media content. In another embodiment, the information can be channel identification and a time stamp or other indicator of time. Based on this information, the media content can then be identified.

The controller 180 can then use the identification of the media content to generate an enhancement for the message. The enhancement can be media content embedded in the message, such as one or more images taken from the media content, for presentation at the social network 175. In one embodiment, the enhancement can be additional text that is generated based on the media content and based on the text that was converted from the audio message. For instance, the controller 180 can generate one or more questions based on the text and the media content, such as "have you seen movies A, B and C, which starred actress X", where the media content was a movie starring actress X and the text positively described actress X's performance in the movie. As another example, the controller 180 can generate one or more questions based on the text and the media content, such as "have you heard songs B, C and D, which are sung by singer Y", where the media content was song A sung by singer X and the text negatively described singer X's performance of the song. Songs X and Y can be in the same genre, which is determined from the identity of the media content (i.e., song X). In one embodiment, the controller 180 can generate the enhancement text based on a context of the voice message where the controller determines the context.

In one embodiment, the enhancement can be generated based on one or more rules or policies associated with the user, the recipient(s), and/or the social network 175. For instance, the enhancement can be generated based on user profiles associated with the sender and/or the recipient(s). The user profiles can indicate a type or category of associated information that is to be included in the enhancement. For example, the user profile can indicate questions to be included in the enhancement, such as whether anyone desires to see a singer in concert, where the audio message was associated with a singer and the media content being consumed was a song performed by the singer.

The enhancement can also be generated based on rules or polices of the social network 175 independent of any user profiles. For example, a sender and one or more recipients can be subscribed to a particular service of the social network, such as a video game. The enhancement can be information associated with the particular video game (e.g., an available software update), which is also associated with the audio message and the media content being consumed.

In one embodiment, the message request and the audio message can be transmitted from the controller 107 to the computing devices 130, such as through the gateway 104 and/or through the STB 106. In one embodiment, the controller 107 is a Voice Activated Remote Control (VARC) that can capture voice messages from the sender and can control operation of one or more display devices 108, such as through use of the STB's 106. In another embodiment, the controller 107 can capture the audio message and can send control signals associated with the display device 108, but the controller is not operable to engage in voice communication with other communication devices. In another embodiment, the audio message and the message request can be transmitted from a communication device (e.g., a cell phone), which is configured for voice communication with other devices. In this example, the communication device can be a multi-mode communication device, which can transmit the audio message and/or the message request in a first mode of communication (e.g., WiFi) and can engage in voice communication in a second mode of communication (e.g., cellular communication). Other modes of communications are also contemplated by the exemplary embodiments.

The exemplary embodiments also contemplate the controller 180 determining the media content without use of identification information in the message request or based upon partial identification information. For instance, the controller 107 can record a portion of a song and can include it in the message request along with the audio message. The recorded portion can be analyzed and compared to a library of songs for a match. In one embodiment, channel information and/or time information can be provided with the message request to facilitate determining a matching song. For instance, the channel and/or time information can narrow the determination to selecting among a subset of songs from the library based on a genre of music. The determination of the media content can be based on other media content formats, such as movies or video games. For instance, the controller 107 can include a camera for capturing one or more images from the movie or video game, which can then be analyzed by the controller 180 to determine the media content based on a library of movies and/or video games. The library of songs, movies, video games and so forth can be a database maintained by the computing devices 130 and/or can be a remote depository of media content that is accessible by the controller 180.

Figure 2:
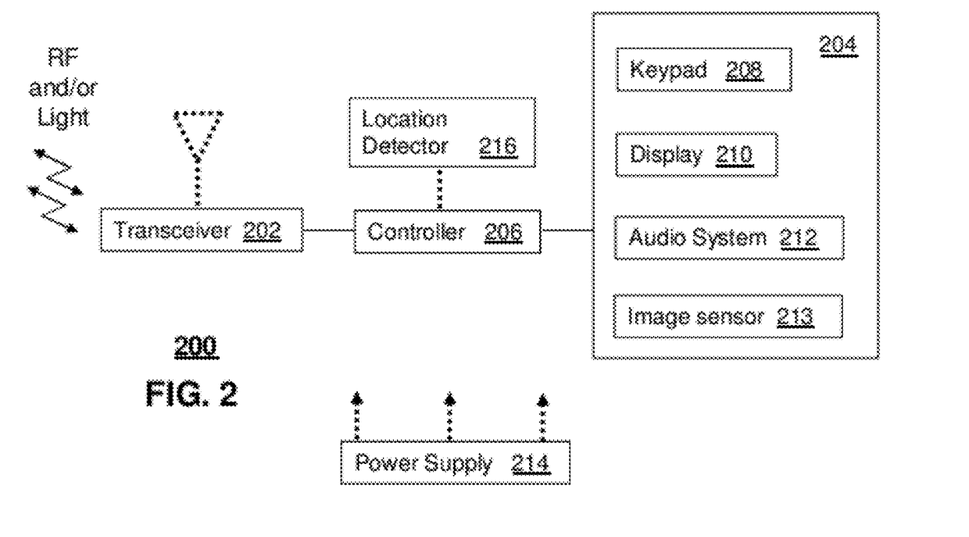
FIG. 2 depicts an illustrative embodiment of a communication device that can be utilized in the communication systems of FIGS. 1 and 3.

FIG. 2 depicts an exemplary embodiment of a communication device 200. Communication device 200 can serve in whole or in part as an illustrative embodiment of the communication devices of FIG. 1 and other communication devices described herein. The communication device 200 can comprise a wireline and/or wireless transceiver 202 (herein transceiver 202), a user interface (UI) 204, a power supply 214, a location detector 216, and a controller 206 for managing operations thereof. The transceiver 202 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 202 can also be adapted to support circuit-switched wireline access technologies (such as PSTN), packet-switched wireline access technologies (such as TCP/IP, VoIP, etc.), and combinations thereof.

The UI 204 can include a depressible or touch-sensitive keypad 208 with a navigation mechanism such as a roller ball, joystick, mouse, or navigation disk for manipulating operations of the communication device 200. The keypad 208 can be an integral part of a housing assembly of the communication device 200 or an independent device operably coupled thereto by a tethered wireline interface (such as a USB cable) or a wireless interface supporting for example Bluetooth. The keypad 208 can represent a numeric dialing keypad commonly used by phones, and/or a QWERTY keypad with alphanumeric keys. The UI 204 can further include a display 210 such as monochrome or color LCD (Liquid Crystal Display), OLED (Organic Light Emitting Diode) or other suitable display technology for conveying images to an end user of the communication device 200. In an embodiment where the display 210 is touch-sensitive, a portion or all of the keypad 208 can be presented by way of the display 210.

The UI 204 can also include an audio system 212 that utilizes common audio technology for conveying low volume audio (such as audio heard only in the proximity of a human ear) and high volume audio for hands free operation. The audio system 212 can further include a microphone for receiving audible signals from an end user. The audio system 212 can also be used for voice recognition applications. The UI 204 can further include an image sensor 213 such as a charged coupled device (CCD) camera for capturing still or moving images.

The power supply 214 can utilize common power management technologies such as replaceable and rechargeable batteries, supply regulation technologies, and charging system technologies for supplying energy to the components of the communication device 200 to facilitate long-range or short-range portable applications. The location detector 216 can utilize common location technology such as a global positioning system (GPS) receiver for identifying a location of the communication device 200 based on signals generated by a constellation of GPS satellites, thereby facilitating common location services such as navigation.

The communication device 200 can use the transceiver 202 to also determine a proximity to a cellular, WiFi or Bluetooth access point by common power sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such as Flash, ROM, RAM, SRAM, DRAM or other storage technologies.

The communication device 200 can be adapted to perform the functions of the media processor 106, the media devices 108, or the portable communication devices 116 of FIG. 1, as well as IMS Communication Devices and PSTN Communication Devices. It will be appreciated that the communication device 200 can also represent other common devices that can operate in communication system 100 of FIG. 1 such as a gaming console and a media player.

Figure 3:
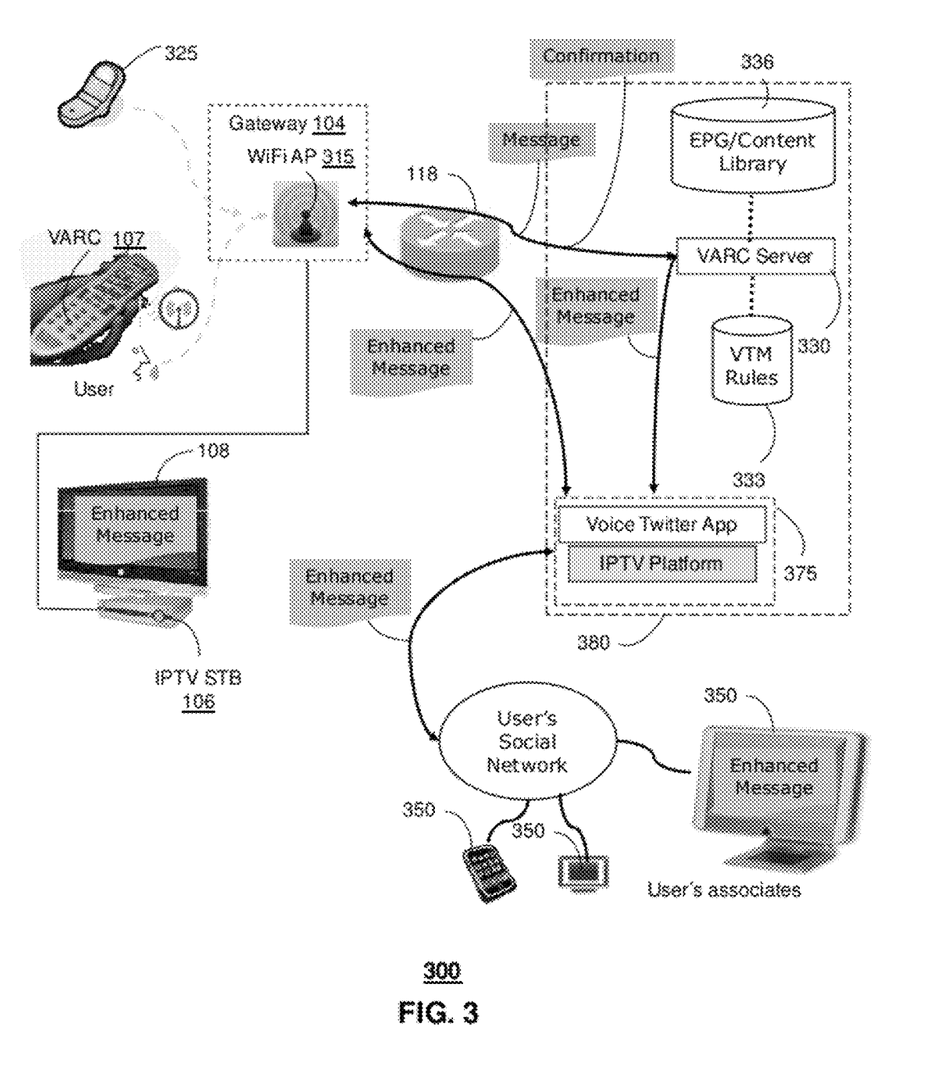

FIG. 3 depicts an illustrative embodiment of a communication system 300 for delivering media content. Communication system 300 can be overlaid or operably coupled with communication system 100 as another representative embodiment of communication system 300. System 300 can include a messaging system 380 including VARC server 330 (such as computing device 130 of FIG. 1.) The VARC server 330 can receive a voice message from a Wireless Access Point (WAP) 315. In this exemplary embodiment, the WAP 315 is a WiFi access point that is being implemented on the gateway 104. However, the present disclosure contemplates the use of other wireless technologies, such as Bluetooth, as well as other components implementing the WAP 315, such as the STB 106.

In one embodiment, the WAP 315 can be accessed by a controller of the STB 106 (such as VARC 107) and can utilize the WiFi communication for receipt of signals from the VARC. In another embodiment, the VARC 107 can be a multi-mode device, such that the voice message can be transmitted using a first mode of communication (e.g., WiFi communication) and control signals associated with presentation of media content can be transmitted using a second mode of communication (e.g., IR communication). The WAP 315 can receive a voice input via the VARC 107. In one embodiment, the VARC 107 can include a dedicated button for interacting with the VARC server 330, such as via WiFi communication with the gateway 104 that communicates over the access network 118 with the server.

In another embodiment, a message sender can depress a button on the VARC 107 to initiate the voice message service. Once the button is depressed, a message request is transmitted from the VARC 107 to the VARC server 330 in order to access the social network. The social network can be a third party network (such as network 175 having its own servers to maintain a social website) or can be a network established by the service provider.

The VARC 107 can also capture a voice message and begin streaming audio signals representing the voice message to the VARC server 330, such as through the gateway 104. The gateway 104 can transmit content identification information to the VARC server 330 for determining an identity of the media content being presented at the time of the voice message. In one embodiment, the STB state (at the time of the voice message) can be transmitted to the VARC server 330 by the gateway 104 or another device, such as the STB 106. For example, the STB state can include an identification of a channel being viewed at the time of the voice message.

In another embodiment, the VARC 107 can be used to capture a portion of the media content that is being viewed at the time of the voice message. In one embodiment, the portion of the media content is captured by transmitting record signals to the STB 106 so that the portion of the media content is recorded by the STB. In another embodiment, the portion of the media content is captured by the VARC 107, such as recording a song or capturing images of a movie or video game via a camera or other recording device incorporated into the controller. The portion of the media content can then be transmitted to the VARC server 330 to facilitate identification of the media content.

In one embodiment, to tie the state information of the STB 106 with a specific VARC 107, the VARC 107 can maintain the identity information of a specific STB 106 for which it communicates with at any given time. Every time that a VARC 107 sends the captured audio input from the user to the VARC server 330, it can also send the identity of the STB 106 to the VARC server in a header file associated with the audio stream. Thus, the VARC server 330 can know the identity of the STB 106 and can then use that information, along with a timestamp associated with each VTM (Voice Twitter Message) request, to determine the identity of the media content being viewed at the time of the VTM generation. Of course, the VTM could be a message associated with any social network and is only used as an example.

In another embodiment, the device utilized for interfacing with the WAP 315 can be a mobile device 325 that is configured for voice communication, such as a cellular phone. For example, a multi-mode mobile device 325 can utilize WiFi communication to communicate with the gateway 104 for using the voice message service while using cellular communication for providing voice communications with other communication devices (such as devices 350). In one embodiment, the mobile device 325 is not associated with the gateway 104 or the STB 106. For example, a sender who desires to send a voice message to the social network 175 can access the network via another user's gateway 104 or STB 106.

The VARC server 330 can receive the audio signals representing the voice message and can convert the voice message into text, such as through use of an automatic speech recognition engine. In one embodiment, the conversion of the voice message to text can be performed by the VARC server 330 in real-time. The VARC server 330 can also apply one or more rules or policies from the VTM rules, which can be stored in a database 333 maintained by the server or which can be otherwise accessible by the server from another source. The VTM rules can establish a procedure for processing particular message requests, such as identifying recipients based on a user profile associated with the sender of the request, authenticating the sender to the social network and so forth.

The VARC server 330 can also determine an identity of the media content based on one or both of the content identification information and the captured portion of the media content. For example, the content identification information can include the channel being viewed, which can be correlated with the time of the voice message (such as through a time stamp accompanying the message request). This information can then be used to identify the media content based on an EPG/Content library 336 which includes scheduling information for various media content. In one embodiment, the captured portion of the media content can be matched with media content stored in the library 336 to determine the identity of the media content, such as through voice, audio and/or image recognition. In another embodiment, the channel being viewed and/or the time information can be utilized to determine a genre of the music or TV program being viewed or other type of media content. The genre can be utilized for narrowing the group of media content in the library to be analyzed for a match with the media content. In one embodiment, the conversion of the voice message to text can be facilitated by the identification of the media content. For instance, the media content can be identified in order to establish a context of the voice message and the context can be utilized for assisting in voice recognition. As an example, a voice message may have a word that is difficult to identify. The VARC server 330 can identify the media content associated with the voice message and can determine a context of the voice message, such as the message sender discussing a movie. The VARC server 330 can then reduce the possible identities of the word based on the context, such as through a word list associated with the context (e.g., the words actor, action, actress, and act being associated with the context of a movie). In one embodiment, speech recognition can be optimized since different speech recognition grammars can be created depending on the context (such as music genre or TV channel or TV program). This can increase the likelihood of identifying words that are difficult to recognize since those words would be included in the appropriate separate grammars. For example, a country music speech recognition grammar could be used for recognizing voice messages when the TV is tuned to a country music channel. The same could apply for TV or movie channels when the content falls generally into a category or genre. For example, the movie channel AMC (American Movie Classics) shows lots of classic movies so a classic movie speech recognition grammar could be created to make it more likely that words from that kind of content (actor names, character names, words related to the specific movie, etc) would be recognized in the voice message. The same could apply for specific news channels. If it is possible to identify the media content based on an EPG/Content library 336, speech recognition grammars could be customized or otherwise built for that identified media content and could include words that are specific to the identified media content. These customized speech recognition grammars could then be applied to other identified media content that is similar to or otherwise associated with the previous identified media content, such as media content falling within a category of Movie Classics as described above.

The VARC server 330 can obtain additional content to enhance the voice message of the sender based on the identity of the media content being viewed or otherwise consumed at the time of the voice message. In one embodiment, the additional content can be obtained based on a context of the voice message, where the context is determined by the VARC server 330. In another embodiment, the additional content can be obtained based on a user profile associated with the sender and/or the recipients. In yet another embodiment, the additional content can be obtained based on the social network and independent of the sender and recipients. In one embodiment, the additional content can be text generated by the VARC server 330 that is associated with the media content. The text can be in the form of a question regarding the media content, such as whether the recipients are familiar with other media content by the same artist where the other media content is identified in the additional content text.

The additional content can be embedded in the enhanced message along with the text representing the voice message, such as providing images of the additional content along with the text in a message. In one embodiment, the system 380 can include message module 375 (which contains, for example, a Voice Twitter Application on the IPTV platform associated with a channel or application running on STB 106) for generating or otherwise facilitating the generation of the enhanced message. The VARC server 330 can deliver the enhanced message to the STB 106 for presentation on the display device 108. The enhanced message can also be accessed by other communication devices 350 that are associated with the sender via the social network. For instance, the enhanced message can be posted on a social network website and viewed by members who have been granted permission by the sender to view the enhanced message. In one embodiment, the social network website can be accessed over the Internet by the STB 106, as well as the communication devices 350.

In one embodiment, the Voice Twitter Application of message module 375 (where we are using Twitter as an example of a social network website) could access or retrieve the messages from the social network website using APIs (Application Programming Interfaces) so the user is actually viewing these messages on the STB because the messages are being retrieved by the Voice Twitter Application page as opposed to a scenario where the STB loads the social network website directly. Effectively, the Voice Twitter Application can be a page (an application or channel on the STB) which is the user interface for using this enhanced messaging capability. In one embodiment, the Voice Twitter Application can show continuous status while the voice messages are being created, the recognized voice message, and enhanced message that will be sent out. Thus, the Voice Twitter Application is used to compose the enhanced messages but it can also be used to view messages on the social network.

In one embodiment, a confirmation message can be transmitted from the VARC server 330 to the STB 106 based on receipt of the message request from the VARC 107. The confirmation can include the converted text so that the message sender can ensure that the message was accurately converted. The confirmation can also include the additional content so that the message sender can authorize posting of the particular additional content.

Figure 4:
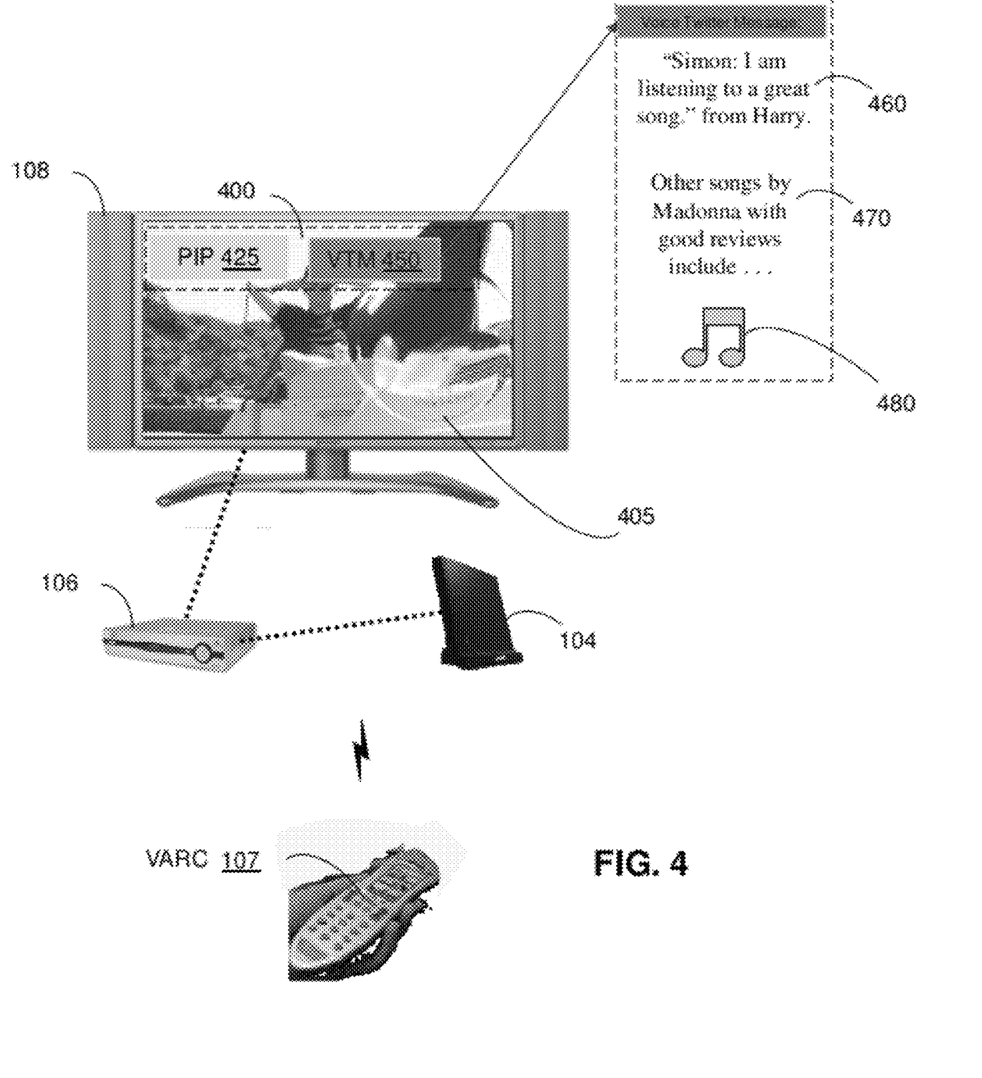
FIGS. 4 and 5 depict illustrative embodiments of a graphical user interface that can be presented on one or more of the display devices of FIGS. 1 and 3.

FIG. 4 depicts an illustrative embodiment of a Graphical User Interface (GUI) 400 that can be presented for the voice message service. GUI 400 can be presented on display device 108 by either or both of the STB 106 and the gateway 104. GUI 400 can be positioned over a portion of media content 405 already being presented by the display device 108. In one embodiment, the presentation can be semi-transparent. GUI 400 can include a Picture-In-Picture (PIP) 425 and an enhanced message 450 (such as a voice twitter message). The PIP 425 can be a window to present the media content or a portion thereof that is being viewed by the message sender at the time of the message request.

The enhanced message 450 can include text 460 that represents the voice message captured by the VARC 107 and additional content, such as content 470 which is text generated by the VARC server 130 based on the media content. The exemplary additional content 470 depicts information about media content associated with the same artist and within the context of the voice message (e.g., a positive review of a song by Madonna), while the exemplary additional content 480 depicts another song by the artist.

In one embodiment, the STB 106 and/or the gateway 104 can include a controller to wirelessly receive control signals from the VARC 107 and can control presentation of media content on the display device 108 based on the control signals. The controller of the STB 106 and/or the gateway 104 can wirelessly receive a voice message from the VARC 107, wherein the voice message is an input into the VARC 107. The controller of the STB 106 and/or the gateway 104 can transmit the voice message to the VARC server 330 (shown in FIG. 3) for generating text based on the voice message and can transmit content identification information associated with the media content to the server. An identity of the media content presented at the time of receiving the voice message can be determined by the VARC server 330 based on the content identification information, where an enhanced message comprising the text and additional content is generated by the server. The additional content can be obtained by the VARC server 330 based on the identity of the media content. The controller of the STB 106 and/or the gateway 104 can receive the enhanced message from the VARC server 330 and can present the enhanced message on the display device 108, where the enhanced message is accessible by the one or more communication devices 350 (shown in FIG. 3) that are associated with a social network and are remote from the STB and/or gateway.

Figure 5:
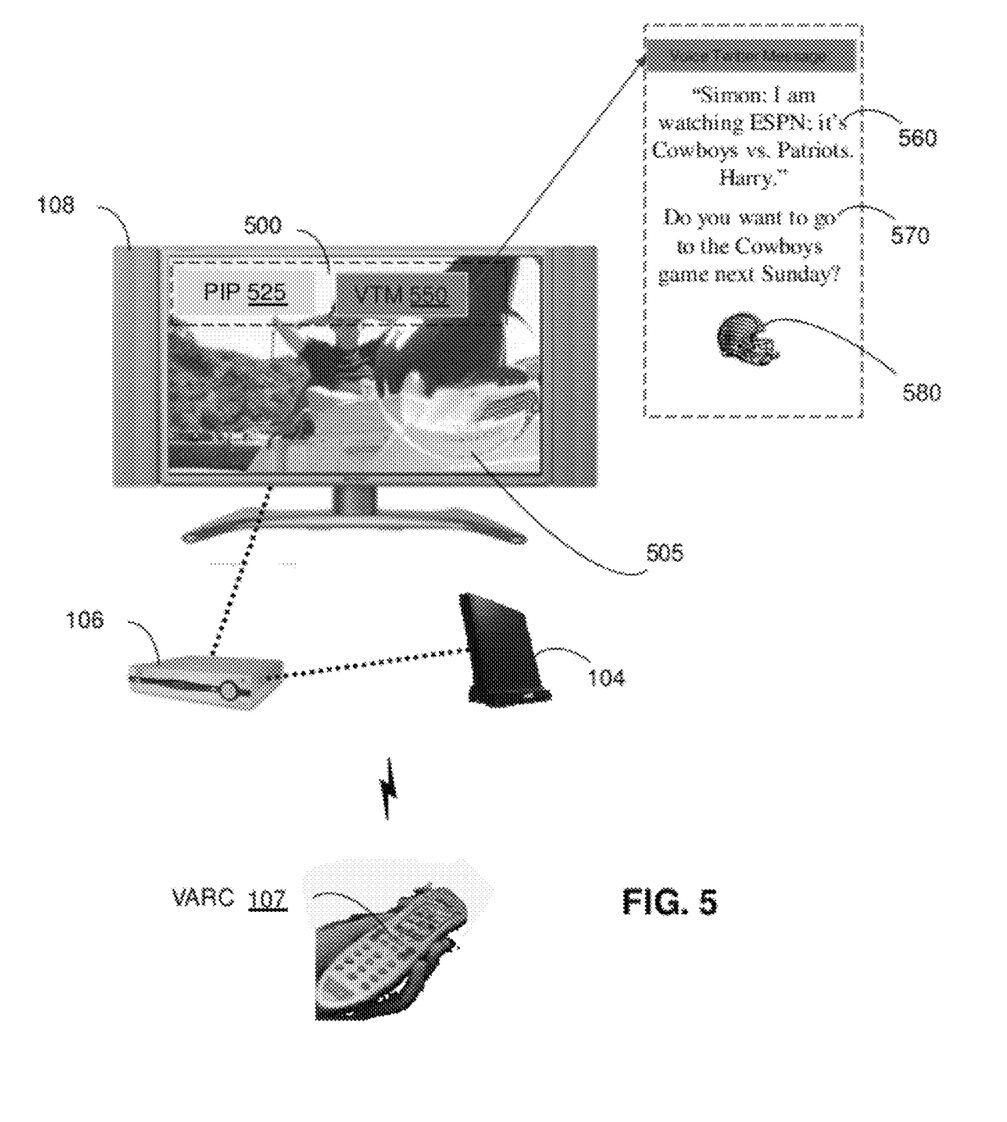

FIG. 5 depicts an illustrative embodiment of a Graphical User Interface (GUI) 500 that can be presented for the voice message service. GUI 500 can be presented on display device 108 by either or both of the STB 106 and the gateway 104. GUI 500 can be positioned over a portion of media content 505 already being presented by the display device 108. In one embodiment, the presentation can be semi-transparent. GUI 500 can include a Picture-In-Picture (PIP) 525 and an enhanced message 550 (such as a voice twitter message). The PIP 525 can be a window to present the media content or a portion thereof that is being viewed by the message sender at the time of the message request.

The enhanced message 550 can include text 560 that represents the voice message captured by the VARC controller 107 and additional content, such as content 570 which is text generated by the VARC server 330 based on the media content. The exemplary additional content 570 depicts a question posed to the message recipient(s), while the exemplary additional content 580 depicts one or more still or moving images associated with the media content (e.g., a highlight of a catch from earlier in the football game).

Figure 6:
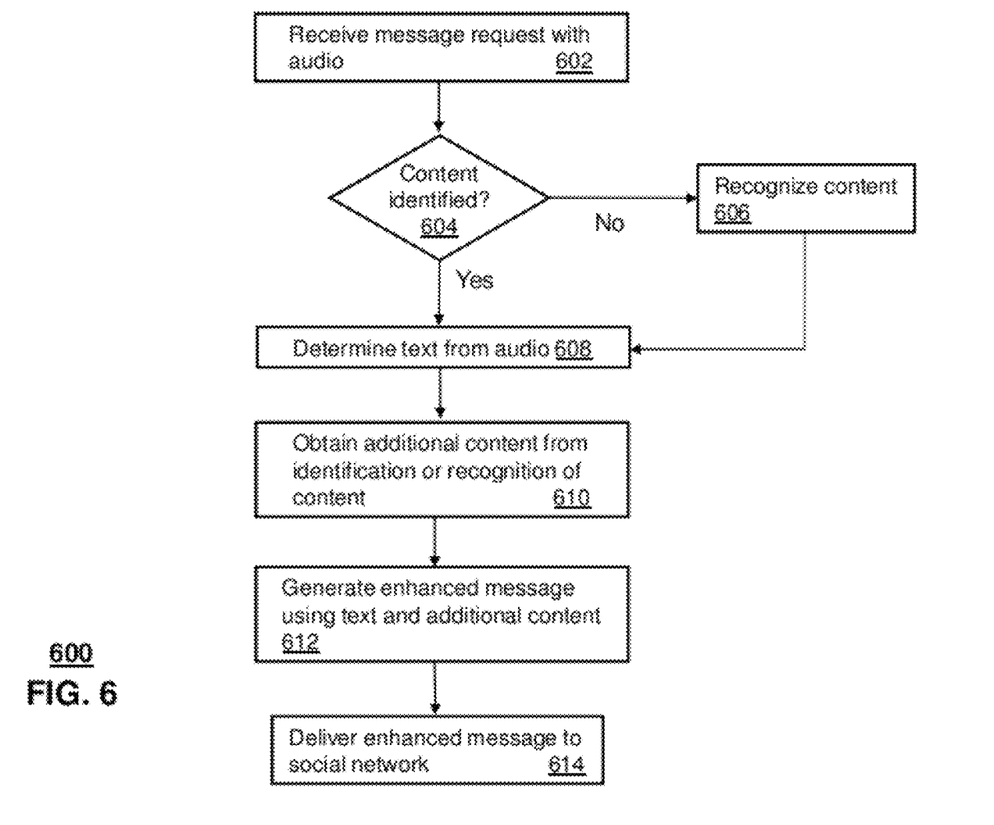
FIG. 6 depicts an illustrative embodiment of a method operating in portions of the devices and systems of FIGS. 1-5.

FIG. 6 depicts an illustrative embodiment of a method 600 operating in portions of the devices and systems described herein and/or illustrated in FIGS. 1-5. Method 600 can begin with step 602 in which the VARC server 330 receives a message request along with audio signals representing a voice message, such as from the gateway 104.

In step 604, the VARC server 130 can determine if information has been provided, such as metadata including a title of the media content, from which the media content can be identified. In one embodiment, the message request can include content identification information from which the identity of the media content can be determined, such as a state of the STB 106 at the time of the voice message which includes the channel being viewed and time information. If sufficient information for identifying the media content is not included in the message request then the VARC server 330 can attempt to recognize the media content in step 606 based on an analysis of a portion of the media content received from the gateway 104 and/or the STB 106. The portion of the media content can be received with the message request and/or can be received in response to a query by the VARC server 330 for additional identification information.

In step 608, text can be generated by the VARC server 330 that represents the voice message. In one embodiment, the identification of the media content can be utilized to facilitate conversion of the voice message to text. For example, the VARC server 330 can determine a context of the voice message based on the media content and can determine or otherwise recognize words in the voice message based in part on that context.

Once the identity of the media content is determined, then in step 610 the VARC server 330 can obtain additional content based on the identity of the media content. The additional content can be obtained by the VARC server 330 either from another source or by generating it. In one embodiment, the VARC server 330 applies VTM rules from database 333 to generate the additional content. The additional content can be in a number of different formats including text, audio and images.

In another embodiment, the additional content is based on the identity of the media content and a context of the voice message as determined by the VARC server 330. For example, the voice message can include a positive review of a particular actor in a movie. The VARC server 330 can determine the context of the voice message is the positive review of the particular actor performing in the identified media content. The VARC server 330 can then generate additional content, such as a description of other movies in which the actor received positive reviews. The context of the voice message allows the VARC server 330 to include other movies in which the actor also received positive reviews, as opposed to performing a keyword search for the actor which would provide a list of all movies (including movies in which a negative review was received) in which the actor performed. In one embodiment, the additional content can be text in the form of a question associated with the media content. The additional content can be obtained using other factors, including user preferences associated with either or both of the message sender and recipients, monitored viewing behavior associated with either or both of the message sender and recipients, and so forth.

In step 612, the VARC server 130 can compose the enhanced message based on the text and the additional content, such as through use of message module 375. In one embodiment, the additional content and the text can be aggregated into a single message without attachments, although the exemplary embodiments contemplate utilizing attachments for all or a portion of the additional content. The enhanced message can then be delivered by the VARC server 330 to the social network in step 614. In one embodiment, the enhanced message can be delivered to the display device 108 of the STB 106 so that the message sender can view the enhanced message. In another embodiment, the enhanced message can be presented first to the message sender for review and approval, and then delivered to the social network, where it is accessible by one or more other communication devices 350 that have been provided permission by the message sender to view the enhanced message. In another embodiment, the sender can be provided the opportunity to edit or otherwise alter the additional content included in the enhanced message. In yet another embodiment, the enhanced message or the information that makes up the enhanced message can be provided to one or more servers of a third party that maintains the social network so that the third party can post the enhanced message.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 600. For example, a PDA can be adapted to capture voice messages and initiate the voice message service.

In one embodiment, the message can be sent so that the recipient(s) can click on a button or a link so the recipient's STB 106 goes to the channel or location within the content. If the content was recorded locally, the local DVR could queue up to that point. The exemplary embodiments also contemplate utilizing a network DVR for delivering the media content or a portion thereof to the recipients.

In another embodiment, a first user can voice-browse an EPG to find a programming that is desired. The first user can create a voice message for a second user by speaking a few words into the VARC 107 and can continue to watch the programming. The VARC server 330 can send an SMS to a second user. The voice message can indicate to the second user to tune to the VTM channel or application. The channel being viewed by the first user can then be displayed in a PIP window for the second user. The second user will also see the voice message spoken by the first user. In one embodiment, the second user can receive the media content in the PIP window for a limited duration, where the second user is not subscribed to receive the content.

In yet another embodiment, the VTM rules can dynamically compose EPG-related questions or assertions that are based on the media content. Subject matters, such as TV metadata including plot, rating information, genre, actors, directors and so forth can be explored using the dynamic composition of questions.

Other suitable modifications can be applied to the present disclosure without departing from the scope of the claims below. Accordingly, the reader is directed to the claims section for a fuller understanding of the breadth and scope of the present disclosure.

Figure 7:
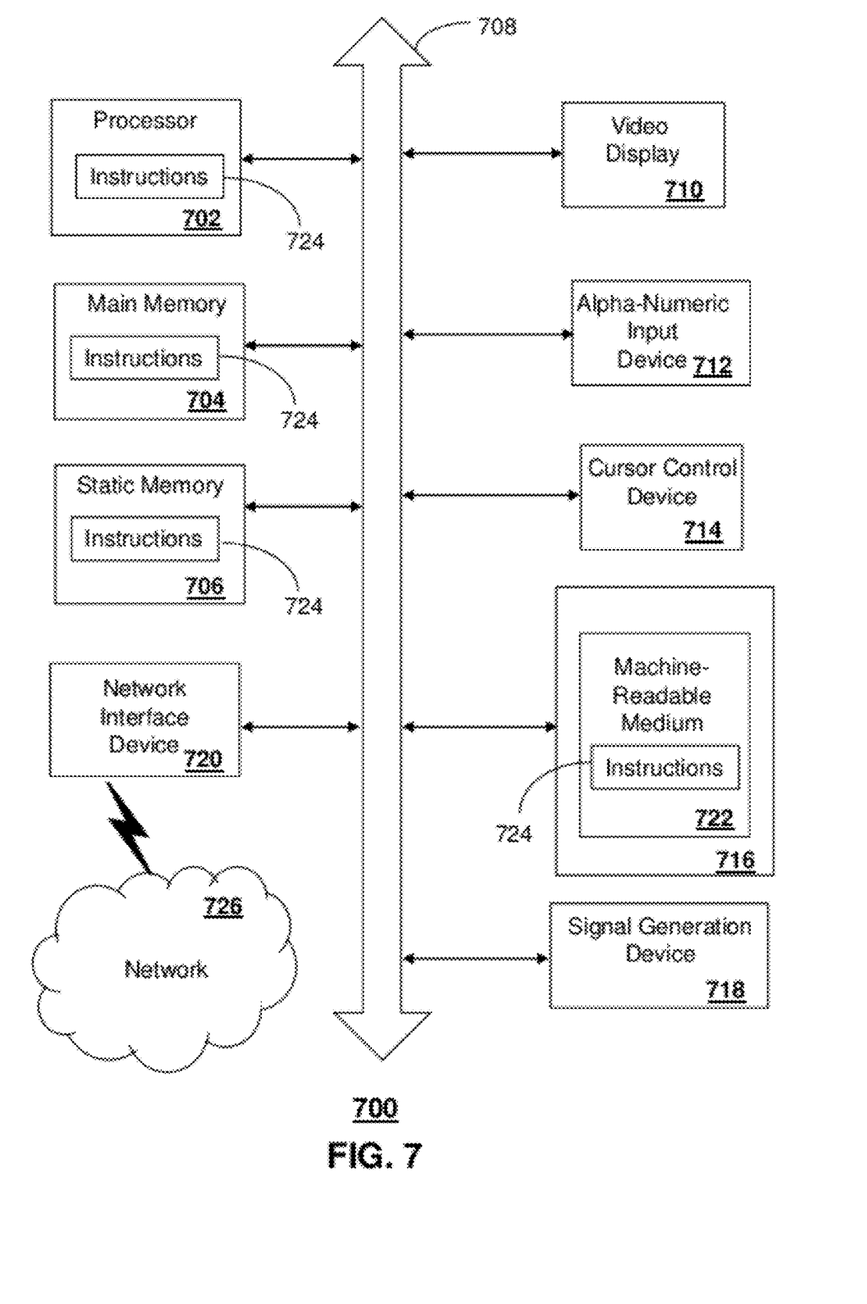
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
    a controller; and
    a memory storing instructions that, when executed by the controller, cause the controller to perform operations comprising:
        receiving audio signals and content identification information from a gateway, the audio signals representing a voice message inputted into a remote control device in communication with the gateway when media content is being presented by a display device in communication with the gateway, the content identification information being associated with the media content;
        generating text representing the voice message based on the audio signals;
        determining an identity of the media content based on the content identification information;
        determining a context of the voice message;
        generating an enhanced message comprising the text and additional content, wherein the additional content is obtained by the controller based on the identity of the media content and the context of the voice message; and
        transmitting the enhanced message to the gateway for presentation on the display device, wherein the enhanced message is accessible by a group of communication devices, wherein users of the group of communication devices and a user of the remote control device are associated with each other by a social network server managing a social network website, and wherein the group of communication devices are remote from the remote control device.

2. The server of claim 1, wherein the operations further comprise selecting a speech recognition grammar from a group of speech recognition grammars based on the identity of the media content, and generating the text according to the speech recognition grammar.

3. The server of claim 1, wherein the operations further comprise adjusting the speech recognition grammar to recognize words spoken in the voice message.

4. The server of claim 1, wherein the operations further comprise generating the additional content based on the context of the voice message.

5. The server of claim 1, wherein the operations further comprise obtaining the additional content based on user profiles associated with the gateway and the group of communication devices.

6. The server of claim 1, wherein the operations further comprise delivering the media content for presentation at another display device that is operably coupled with one of the group of communication devices, wherein the one of the group of communication devices is not subscribed to receive the media content.

7. The server of claim 6, wherein the media content is presented at the other display device for a pre-determined duration.

8. The server of claim 1, wherein the remote control device is configured for voice communication with at least a portion of the group of communication devices.

9. A computing device comprising:
    a controller; and
    a memory storing instructions that, when executed by the controller, cause the controller to perform operations comprising:
        wirelessly receiving a voice message from a remote communication device, wherein the voice message is an input into the remote communication device;
        transmitting the voice message to a server for generating text based on the voice message;
        transmitting content identification information associated with media content to the server, wherein an identity of the media content being presented at a time of receiving the voice message is determined by the server based on the content identification information, wherein an enhanced message comprising the text and additional content is generated by the server, and wherein the additional content is obtained by the server based on the identity of the media content and based on a context of the voice message;
        receiving the enhanced message from the server; and
        providing the enhanced message for presentation on a display device in communication with the controller, wherein the enhanced message is accessible by a group of communication devices, wherein users of the group of communication devices and a user of the remote communication device are associated with each other by a social network server managing a social network website, and wherein the group of communication devices are remote from the remote communication device.

10. The computing device of claim 9, comprising one of a gateway, a set top box or a gaming console.

11. The computing device of claim 9, wherein the content identification information comprises time information and a channel being viewed at the time of receiving the voice message.

12. The computing device of claim 9, wherein the operations further comprise:
    wirelessly receiving control signals from the remote communication device;
    controlling presentation of the media content on the display device operably coupled with the computing device based on the control signals; and
    transmitting a portion of the media content to the server.

13. A method comprising:
    receiving, by a server including a processor, a voice message from a media processor, the voice message associated with media content presented by the media processor at a time the voice message was captured;
    determining, by the server, a context of the voice message;
    obtaining, by the server, additional content according to an identity of the media content and the context of the voice message;
    generating, by the server, an enhanced message comprising the additional content and text representing the voice message; and providing, by the server, access to the enhanced message for a group of communication devices, wherein users of the group of communication devices and a user of the media processor are associated with each other by a social network server managing a social network website, and wherein the group of communication devices is remote from the media processor.

14. The method of claim 13, comprising providing the enhanced message to the media processor for presentation on a display device operably coupled with the media processor, wherein the providing of the enhanced message causes the media processor to present a graphical user interface superimposed over a portion of second media content being presented by the media processor, wherein the graphical user interface includes a picture-in-picture window for presenting the media content, wherein the graphical user interface includes the additional content and the text representing the voice message, and wherein the context of the voice message comprises a subject matter of media content.

15. The method of claim 13, comprising:
receiving, by the server from the media processor, the media content that was being presented by the media processor at the time the voice message was captured, wherein the media content was recorded by the media processor; and
comparing, by the server, the media content to a sample of media content to determine the identity of the media content, wherein the determining of the context of the voice message is based on the identity of the media content, and wherein the sample of media content is stored among a group of samples of media content accessible to the server.

16. The method of claim 13, comprising determining the identity of the media content based on identification information received from the media processor, wherein the identification information includes a time stamp associated with the voice message and a channel being accessed by the media processor at a time corresponding to the time stamp.

17. The method of claim 13, comprising:
applying, by the server, speech recognition to the voice message;
detecting, by the server, an unclear word in the voice message according to the speech recognition;
determining, by the server, a clarified word representative of the unclear word based on the context of the voice message and the identity of the media content; and
generating, by the server, the text representing the voice message based on the speech recognition and the determining of the clarified word.

18. The method of claim 13, comprising:
accessing, by the server, a user profile associated with the media processor; and
generating, by the server, additional text representing a question related to the media content, wherein the question is generated based on the user profile, and wherein the enhanced message comprises the additional text.

19. The method of claim 13, wherein the context of the voice message comprises a discussion of music or television programming, wherein the enhanced message comprises additional text representing information describing the additional content, and wherein the additional content comprises an image embedded in the enhanced message.

20. The method of claim 13, wherein the voice message is recorded by a remote control device in communication with the media processor, and wherein the remote control device is operable to transmit control signals to the media processor for controlling presentation of the media content by the media processor.

* * * * *